US010939176B2

(12) United States Patent
Wagner et al.

(10) Patent No.: US 10,939,176 B2
(45) Date of Patent: *Mar. 2, 2021

(54) LIVE CONTENT STREAMING SYSTEM AND METHOD

(71) Applicant: Placement Labs, LLC, South Daytona, FL (US)

(72) Inventors: Joshua Joseph Wagner, Port Orange, FL (US); James McCarthy, Daytona, FL (US)

(73) Assignee: Placement Labs, LLC, South Daytona, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/524,707

(22) Filed: Jul. 29, 2019

(65) Prior Publication Data

US 2019/0356959 A1 Nov. 21, 2019

Related U.S. Application Data

(63) Continuation of application No. 15/183,305, filed on Jun. 15, 2016, now Pat. No. 10,368,134.

(Continued)

(51) Int. Cl.
*G06F 15/16* (2006.01)
*H04N 21/475* (2011.01)
(Continued)

(52) U.S. Cl.
CPC ......... *H04N 21/4758* (2013.01); *G06Q 10/10* (2013.01); *G06Q 50/01* (2013.01);
(Continued)

(58) Field of Classification Search
USPC ............... 709/231, 238, 201, 202, 203, 205
See application file for complete search history.

(56) References Cited

U.S. PATENT DOCUMENTS 8,392,206 B2 3/2013 Parekh et al.
8,490,133 B1 7/2013 Parekh et al.
(Continued)

OTHER PUBLICATIONS

PCT International Search Report, for Patent Cooperation Treaty (PCT) Application No. PCT/US2016/037620 filed Jun. 15, 2016, dated Sep. 9, 2016.

(Continued)

*Primary Examiner* — Lan Dai T Truong
(74) *Attorney, Agent, or Firm* — Hanrahan Law Firm, P.A.; Benjamin M. Hanrahan

(57) ABSTRACT

A live media streaming system and method is presented herein. The system and method includes broadcasting a live media stream in at least one of a plurality of themed broadcasting channels, the live media stream being transmitted from a broadcasting device corresponding to a broadcasting user. A jump zone (a physical region or area) is selected or defined based upon predetermined jump zone criteria corresponding to the at least one of the plurality of themed broadcasting channels. Further, a next broadcasting user is selected, wherein the user is located within the physical geographic region of the jump zone. Once the next broadcasting user is selected, a live media stream is broadcasted from the next user's broadcasting device.

9 Claims, 7 Drawing Sheets

Related U.S. Application Data

(60) Provisional application No. 62/181,508, filed on Jun. 18, 2015.

(51) Int. Cl.

| | | |
|---|---|---|
| *H04N 21/2187* | (2011.01) | |
| *H04N 21/258* | (2011.01) | |
| *H04L 29/06* | (2006.01) | |
| *H04N 21/436* | (2011.01) | |
| *G06Q 10/10* | (2012.01) | |
| *G06Q 50/00* | (2012.01) | |

(52) U.S. Cl.
CPC ...... *H04L 65/1069* (2013.01); *H04L 65/4076* (2013.01); *H04N 21/2187* (2013.01); *H04N 21/25841* (2013.01); *H04N 21/436* (2013.01)

(56) References Cited

U.S. PATENT DOCUMENTS

| | | |
|---|---|---|
| 8,498,946 B1 | 7/2013 | Parekh et al. |
| 8,539,542 B1 * | 9/2013 | Elhag ................ H04N 21/2665 725/105 |
| 8,578,426 B2 | 11/2013 | Tiongson et al. |
| 8,678,932 B2 | 3/2014 | Alman et al. |
| 8,683,068 B2 | 3/2014 | Jalili et al. |
| 10,368,134 B2 | 7/2019 | Wagner et al. |
| 2004/0264461 A1 | 12/2004 | Janneteau et al. |
| 2007/0169165 A1 | 7/2007 | Crull et al. |
| 2007/0186230 A1 | 8/2007 | Foroutan |
| 2008/0188290 A1 | 8/2008 | Macguire |
| 2009/0128335 A1 | 5/2009 | Leung |
| 2010/0304702 A1 | 12/2010 | Anzures et al. |
| 2012/0028232 A1 | 2/2012 | Findlay |
| 2012/0072961 A1 | 3/2012 | Marignan |
| 2012/0144412 A1 | 6/2012 | Sharma et al. |
| 2013/0104173 A1 * | 4/2013 | Tjio ..................... H04H 20/55 725/62 |
| 2013/0340016 A1 | 12/2013 | Parekh et al. |
| 2014/0040368 A1 | 2/2014 | Janssens |
| 2014/0206449 A1 | 7/2014 | Alman et al. |
| 2014/0245338 A1 | 8/2014 | Nakamura |
| 2014/0258553 A1 | 9/2014 | Skeen et al. |
| 2015/0124971 A1 * | 5/2015 | Haslam ................ H04H 20/20 381/2 |
| 2016/0286244 A1 | 9/2016 | Chang |
| 2016/0373499 A1 | 12/2016 | Wagner et al. |
| 2017/0017781 A1 | 1/2017 | Turgeman |
| 2017/0251261 A1 | 8/2017 | James |
| 2019/0082491 A1 * | 3/2019 | Shelby ................. H04W 16/14 |

OTHER PUBLICATIONS

Written Opinion of the International Searching Authority, for Patent Cooperation Treaty (PCT) Application No. PCT/US2016/037620 filed Jun. 15, 2016, dated Sep. 9, 2016.

* cited by examiner

LIVE CONTENT STREAMING SYSTEM AND METHOD

CLAIM OF PRIORITY/CROSS REFERENCE TO RELATED APPLICATIONS

The present application is a continuation patent application of previously-filed, currently-pending U.S. patent application Ser. No. 15/183,305 filed on Jun. 15, 2016, which is based on and a claim to priority is made under 35 U.S.C. § 119(e) to U.S. Provisional Patent Application No. 62/181,508 filed on Jun. 18, 2015. The contents of both prior applications are incorporated herein in their entirety by reference.

FIELD OF THE INVENTION

The present invention is generally directed to a system and method for allowing content broadcasting users to compete for the opportunity to broadcast live media, such as live video and/or audio, to a specifically themed channel that is part of a larger collection of themed channels for a limited amount of time with the opportunity to be allotted additional broadcasting time based on live votes by voting or viewing users who are viewing and voting on the content and/or the broadcaster. In certain embodiments, a dynamic jump zone is determined, for example, based upon a geographic location of the current content broadcasting user in order to select the next content broadcasting user who is located within the determined jump zone.

BACKGROUND OF THE INVENTION

Video conferencing and video communications are known, although they are largely used for business to business applications and/or personal one-on-one communications. There is a need for a video, audio and/or mobile streaming system and method that is largely social, competitive and entertaining.

For example, the proposed system and method would allow users to compete with one another for broadcasting time and, in some implementations, while broadcasting, attempt to receive positive votes or high ratings from viewers in order to continue the broadcast. Particularly, users may be able to accumulate points by participating in or completing tasks, such as by performing social shares, broadcasting media, completing surveys, filling out profile information, connecting a profile with external social networks, etc. Those users with the highest ranking or largest number of points have a better opportunity or chance to broadcast via the proposed system and method.

Some implementations may also include a dynamic or moving jump zone, which is a physical or geographic location within which the next broadcasting user must be located. Jump zones may be defined in a number of different ways, including being between a minimum and/or a maximum radial distance from the current broadcasting user, or being in a different state, country, university, college, stadium, etc.

SUMMARY OF THE INVENTION

The present invention is generally directed to a system and method for providing live broadcast feeds on various themed channels, where users, e.g., broadcasting users, compete with one another to earn the ability to broadcast media. In particular, users of at least one embodiment of the system and method may be provided the opportunity to complete tasks within the system and method in order to obtain points or credits. Selection or determination of the next broadcaster, for example, within a themed channel, may be at least partially determined based upon the user's points, credits or ranking within the system and method.

In some embodiments, another factor used to determine or select a user to broadcast media via the system and method may include defining a jump zone. For example, the jump zone may be used to define a physical zone, area, region, etc. within which the next broadcaster must be located. In some cases, the next broadcaster will be selected or determined as being the highest ranking user (or highest ranking user who has indicated a desire to broadcast at that moment) within the jump zone.

For example, the jump zone may be defined as a radial distance from the current broadcasting user (e.g., between a minimum and a maximum radial distance). Other embodiments or channels may define the jump zone as being a next or different state, country, region, university, college, stadium, arena, etc. This creates a dynamic and moving zone within which the next broadcaster must be located.

According, the broadcasters may complete tasks and other opportunities to increase his or her rank within the system and method and hope to outrank other broadcasting users located within the jump zone for the opportunity to broadcast media. If the broadcasting user wins the opportunity to broadcast media, then he or she is assigned a specific (often predetermined) amount of time (e.g., one or two minutes) to broadcast live on a particular themed (or other) channel. During the allotted or initial amount of time, voting users can submit votes attributed to the broadcast—positive votes may result in additional time (e.g., one or two minutes) allotted to the current broadcast, whereas negative votes may result in premature or immediate termination of the current broadcast. Other users may include watching users, or passive viewers who are able to view the broadcasts but do not provide any votes or broadcast themselves.

These and other objects, features and advantages of the present invention will become more apparent when the drawings as well as the detailed description are taken into consideration.

DETAILED DESCRIPTION OF THE INVENTION

Figure 1:
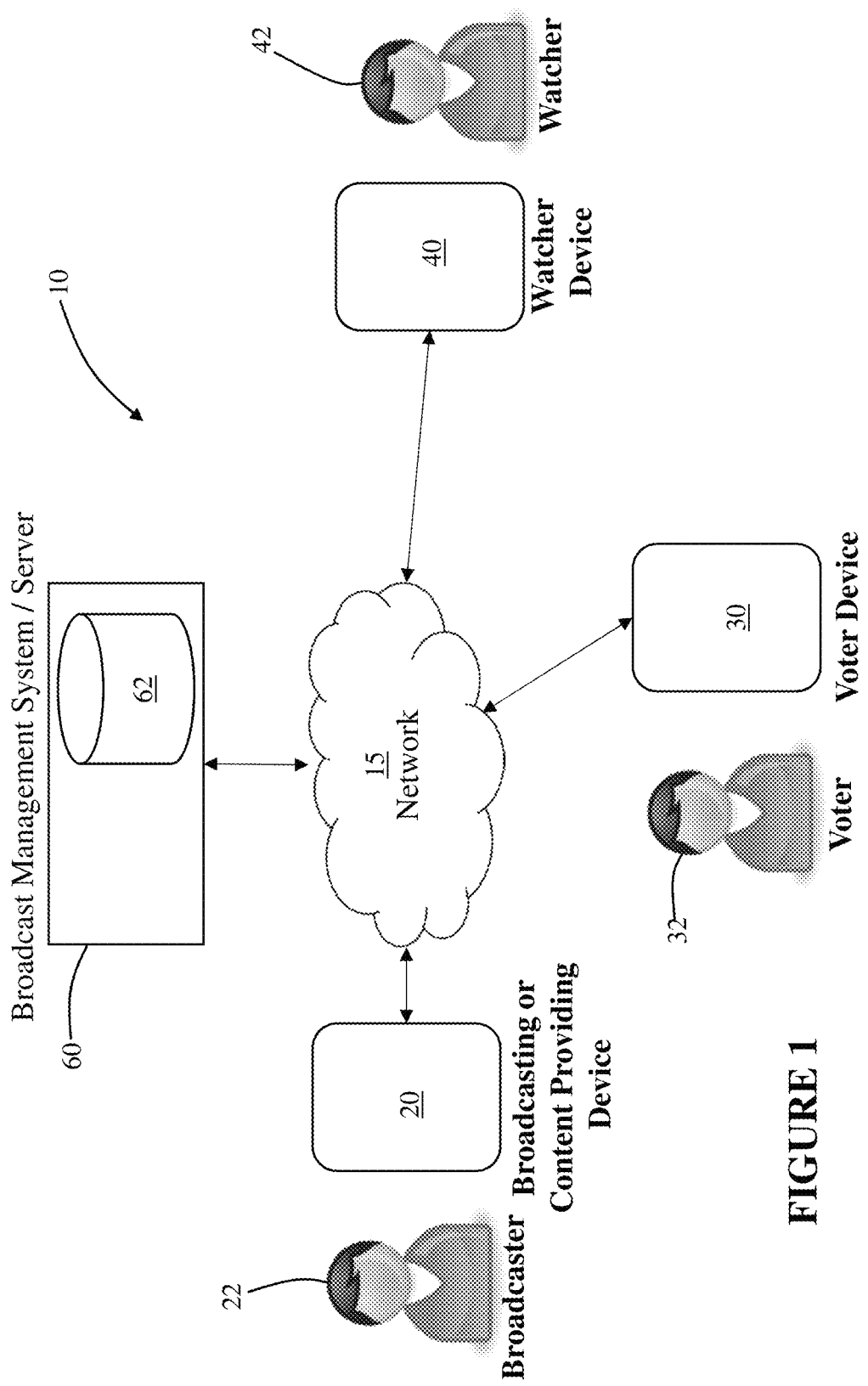
FIG. 1 is a schematic representation of the system as disclosed in accordance with at least one embodiment of the present invention.
Figure 3:
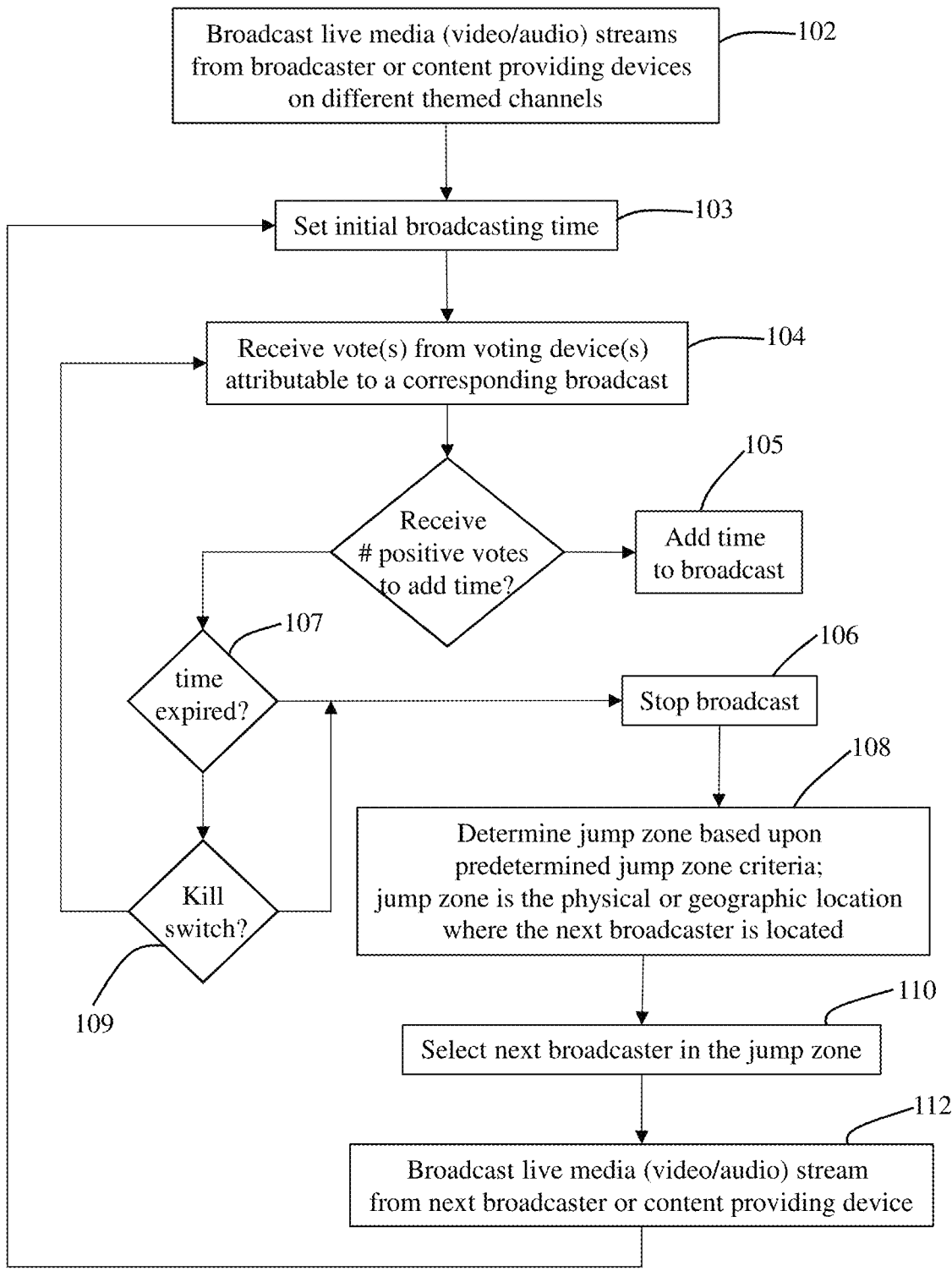
FIG. 3 is a flow chart illustrating the method of at least one embodiment of the present invention.

As shown in the accompanying drawings, and with particular reference to FIGS. 1 and 3, the present invention is generally directed to a system 10 and method 100 for providing a live content stream or broadcast, for example, from one or more content broadcasting or content providing devices 20 to one or more content viewing devices 30, 40. Particularly, in at least one embodiment of the system 10 and/or method 100, broadcasting users 22 will compete with one another for the opportunity to broadcast or stream media from his or her device 20 and to one or more viewing devices 30, 40 or viewing users 32, 42. For instance, the system 10 and/or method 100 of some embodiments will select or determine which broadcasters or users 22 may stream or broadcast media based upon the location of the user(s) 22 and/or based upon a determined rank or number of points within the system 10 or method 100 that each user 22 has accumulated.

More in particular, a jump zone 50 may be calculated or determined by the system 10 or method 100, for example, based upon a location of the current broadcasting user 22 and predetermined jump zone criteria, including, but not limited to a minimum and maximum distance. Other users 22 who may be located within the jump zone 50 may elect to broadcast content from his or her device 20, however, the system 10 and/or method 100 of one embodiment will only select one user (or other predetermined number of users) from within the jump zone 50 to broadcast media next (e.g., once the current broadcast has terminated or ended) for each of a number of different channels. In addition to the location of the potential next broadcaster, that selection may be based upon a number of points the user(s) has accumulated and/or a ranking associated with the user from within or by the system 10 or method 100.

With reference to FIG. 1, the system 10 of at least one embodiment of the present invention includes a broadcast management system 60 interconnected with or communicative with one or more communication, computer or data networks 15. Also as shown in FIG. 1, the system 10 may include one or more content providing devices 20 and one or more content viewing devices, such as a voting device 30 and/or a passive watching device 40, disposed in a communicative relation with the network 15. The broadcast management system 60 may communicate with the various devices 20, 30, 40, for instance, via network(s) 15, in order to implement the various embodiments of the present invention in the intended manner, as described herein. It should also be noted that some embodiments may include an administrative profile or admin user interconnected to the broadcast management system 60, either directly or remotely. In addition to other tasks and roles, the admin user may have permissions to set up, define, change, modify, add or delete various parameters for the one or more broadcasting channels, as provided herein.

Moreover, the computer, communication or data network(s) 15, as used herein, may include virtually any local, remote or wide range communication network or collection of networks capable of facilitating the practice of the present invention in the intended manner, such as the World Wide Web or Internet, telecommunication networks such as 3G, 4G, LTE, etc., Intranet, Wide Area Networks, Bluetooth, Near-field Communication (NFC) networks, etc., or any combination thereof. Particularly, the network(s) 15 can include any known networks for facilitating communicate of media such as audio, video and/or data communications such as, for example, a cellular network, local area network (LAN), the interne, VOIP, or SMS service, etc.

Still referring to the schematic of FIG. 1, the broadcast management system 60 of at least one embodiment of the present invention may include any one or more computer systems structured to store, communicate and/or process data and/or media, including, for example, profile information corresponding to one or more users 22, 32, 42, provide or manage media broadcasting or streaming, for example, from one device 20 to another one or more devices 30, 40, etc.

Figure 2:
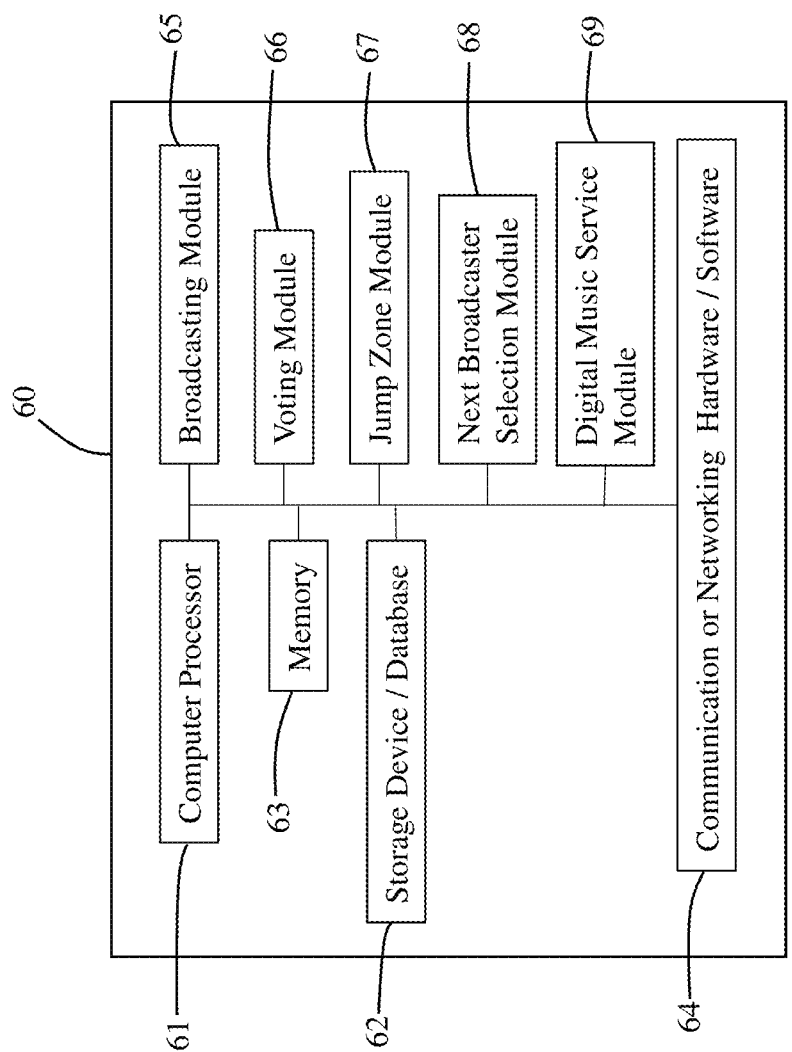
FIG. 2 is a block diagram of the broadcasting management system of at least one embodiment of the present invention.

For instance, as provided in the block diagram of FIG. 2, the broadcast management system 60 may include a computer processor 61, data storage device 62, memory 63, and one or more communication devices or hardware 64 (e.g., network device(s), web server(s), etc.) Particularly, the broadcast management system 60 of at least one embodiment of the present invention may comprise one or more web servers or data servers, including software and hardware structured to receive information and data, and to communicate data, information, media, web pages, applications, etc. via the network 15 in accordance with the present invention.

More in particular, the computer processor 61 may include, for example, any device cooperatively structured to execute or implement computer instructions, software, etc., including the method 100 as disclosed in accordance with at least one embodiment of the present invention. The data storage device 62, as used herein, may include one or more internal, external or removable hard disk drives, CD/DVD, USB drives, solid state drives, virtual drives, could-based storage drives, or other types of volatile or non-volatile memory, and may include any one or more databases or other like data structures configured to store and retrieve data, media, and other information in accordance with the various embodiments of the present invention. Further, the memory device 63, as used herein, may include but is not limited to random access memory (RAM) or other like devices configured to implement the present invention in the intended manner, for example, by at least temporary storing and assisting with the execution of one or more applications or computer programs capable of implementing the system 10 and methods 100 described herein. Moreover, the communication device 64 may include a network communication hardware/software component structured to facilitate communication between the broadcasting management system 60 and/or other devices 20, 30, 40 provided herein.

Furthermore, the user devices, such as the content providing device(s) 22 and/or the content viewing device(s) including the voting device(s) 32 and/or passive watching device(s) 42 of the various embodiments of the present invention may include virtually any computer based system, such as, but not limited to a desktop computer, laptop computer, mobile computer, tablet, cellular or mobile phone, smart phone, media device, game device, PDA, etc. capable of performing the tasks associated with each device, such as capturing or broadcasting media, displaying media, communicating with the network(s) 15 and/or broadcasting management system 60, etc. The broadcasting device(S) 20 may thus include a camera, microphone, or other video and/or audio capturing devices.

Particularly, in some embodiments, a user may first download, install or otherwise access an application (e.g., a mobile application) or website via his or her device corresponding to the system 10 and method 100 of the present invention. For instance, the user may navigate an application store or database (e.g., Apple App Store, or Google Play Store) in order to select, download, install or access an application corresponding to the present invention. In some embodiments, the user may begin by electing to either become a content broadcasting user 22, a voting user 32 and/or a watcher 42. Particularly, in some embodiments, the user will be prompted to create an account or user profile that may contain, among other items, the user's name, email address, or other contact information, username, password, etc. Other profile information may include various text, data, images, pictures, links, etc. that the user may find interesting or that the user may think other users will find interesting. Adding content to a user profile in some instances may be rewarded with points or an increased ranking, which, as described herein, may be used by the system 10 and/or method 100 to determine or select the next broadcaster.

In addition, the user(s) may elect to link one or more external social networking profiles (e.g., Facebook, Twitter, Instagram, etc.) to his or her user profile. For instance, as described herein, the opportunity to broadcast media or content via the system 10 and method 100 of some embodiments is based upon a competitive point system. Linking social network accounts to a user profile of the present invention may be a way to earn points and/or increase a user ranking. It should also be noted that the broadcaster 22 may include his or her own profile page, for example, host by or maintained by the system 10 of the present invention. This profile page can include certain profile information, such as username, location, comments, etc. Other users of the system 10 and method 100 can follow profile page(s) of other users, providing an easy way to keep track of favorites and/or in order to be notified (e.g., by email or through the system 10 and method 100) when a followed user is broadcasting.

Referring now to the high level flow chart of FIG. 3, the method 100 includes broadcasting live media from a content providing device, as shown at 102, for example, via a broadcasting module 65. It should be noted that some embodiments of the present invention may include a plurality of different channels or stations, for example, each with a different or predetermined theme or topic. At any given time, within each channel, there may be a different media broadcast, for example, from different content providing devices 20. Accordingly, the system 10 and method 100 may provide live broadcasting from a plurality of different content providing devices 20 within a plurality of different channels or themed broadcasting channels. Particularly, when a content providing user 22 decides to broadcast media, he or she may first select a channel or themed broadcasting channel within which to broadcast. Similarly, when a content viewing user 32, 42 decides to receive or view a live broadcast, he or she may select a themed broadcasting channel, for example, from a list or other display.

Particularly, for exemplary purposes only, in some embodiments, the channels or themes associated with the channels may include, but are in no way limited to: extreme sports, sports, comedy, cooking, live music, freestyle rap, dance, poetry, economics, politics, faith/religion, animals, pranks, video games, video game tricks, how-to, makeup/hair/fashion, consumer buyer advice, health and fitness, voice over, magic, addiction (people recovering from alcohol and drug addiction), rated "R", college, World, travel, courageous, selling, etc. Other potential channels may include, but are in no way limited to national events (e.g., college football game day), world events (e.g., holidays), internal events (e.g., Coachella).

Figure 4A:
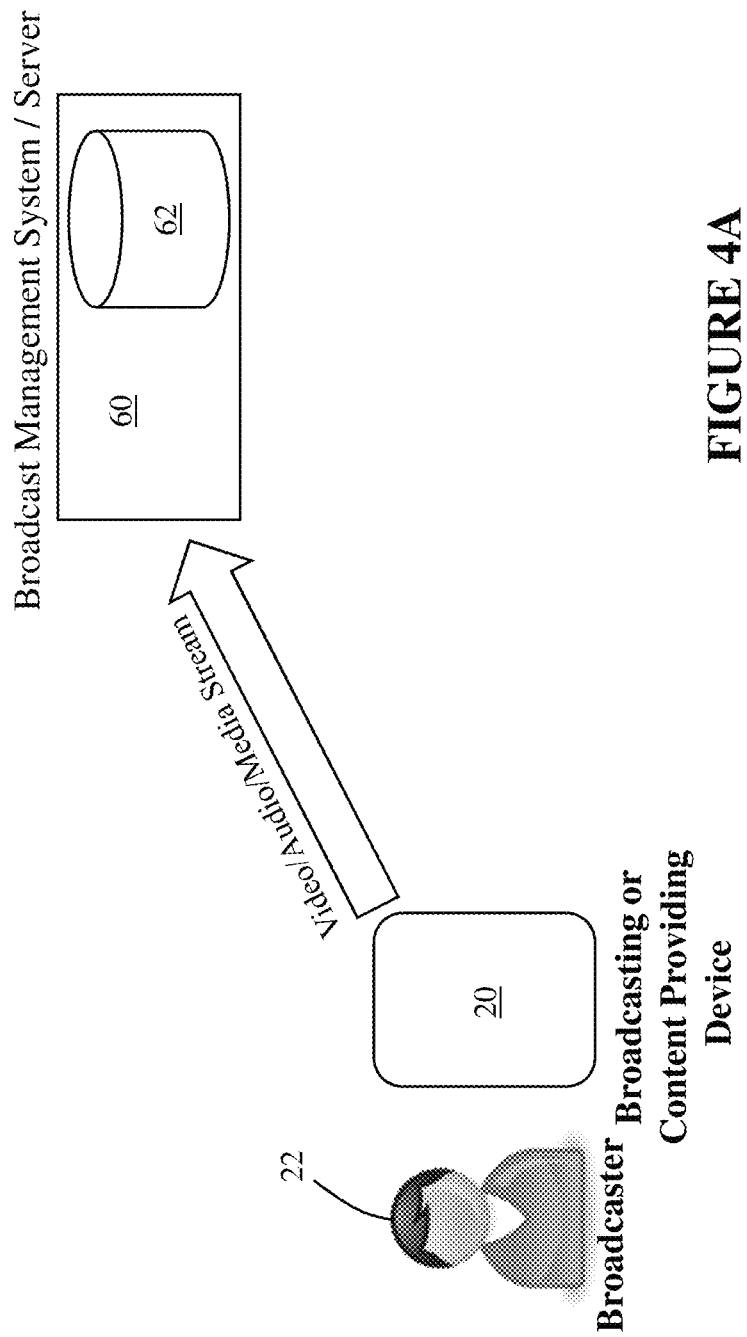
FIG. 4A is a schematic representation of a broadcasting or content providing device streaming a broadcast through the broadcast management system of at least one embodiment of the present invention.

In any event, as schematically shown in FIG. 4A, for example, the content broadcasting user 22 will utilize his or her cell phone, computer, web camera, or other content broadcasting device 20 in order to capture and stream live media. In some embodiments, the live stream or broadcast will be communicated to the broadcast management system 60, for example, via network(s) 15, where other users, such as voting user 32 and/or watching users 42 may select and view the broadcast. Furthermore, some embodiments of the system 10 and/or method 100 of the present invention limit each broadcast to an amount of time, such that, when the time expires, the next broadcaster or user is able to broadcast live on the corresponding channel, for example, as determined via a next broadcaster selection module and/or a jump zone module discussed herein. For instance, as shown at 103 in FIG. 3, the method 100 includes setting an initial broadcasting time. It should be noted that the allotted or initial time may be different for different channels, different regions, different users, etc., and in some embodiments may be extended, for example, based upon received votes, as provided herein.

Figure 4B:
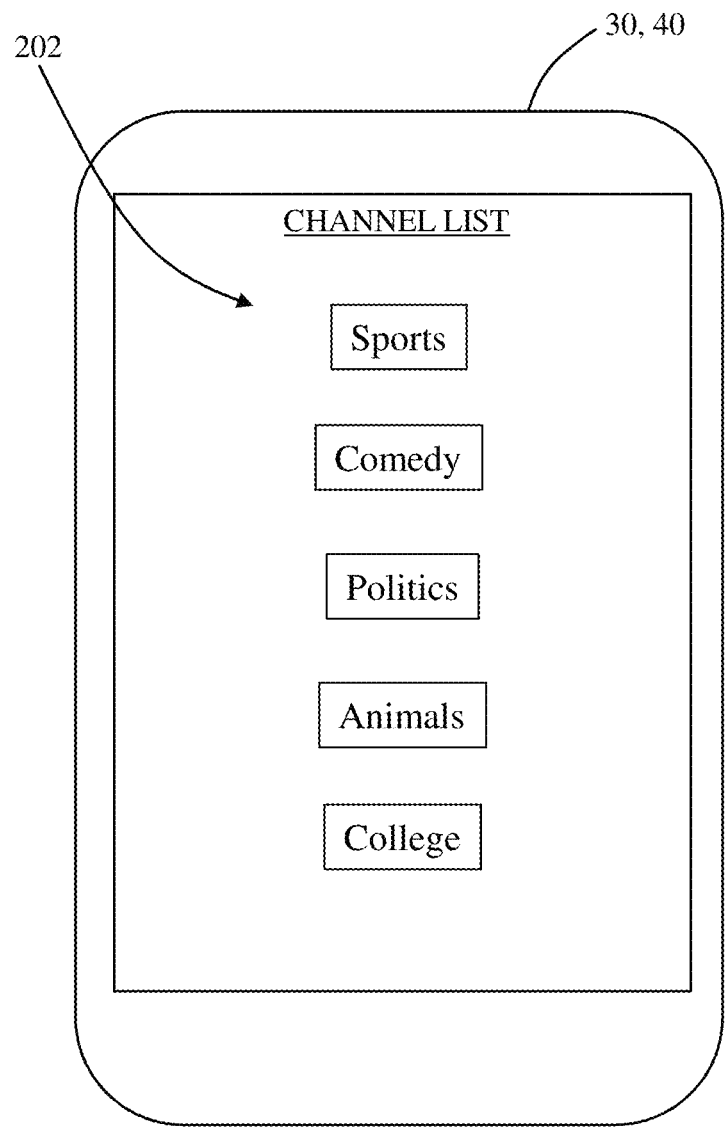
FIG. 4B is an exemplary screenshot illustrating an exemplary channel list of a plurality of themed channels in accordance with at least one embodiment of the present invention.
Figure 4C:
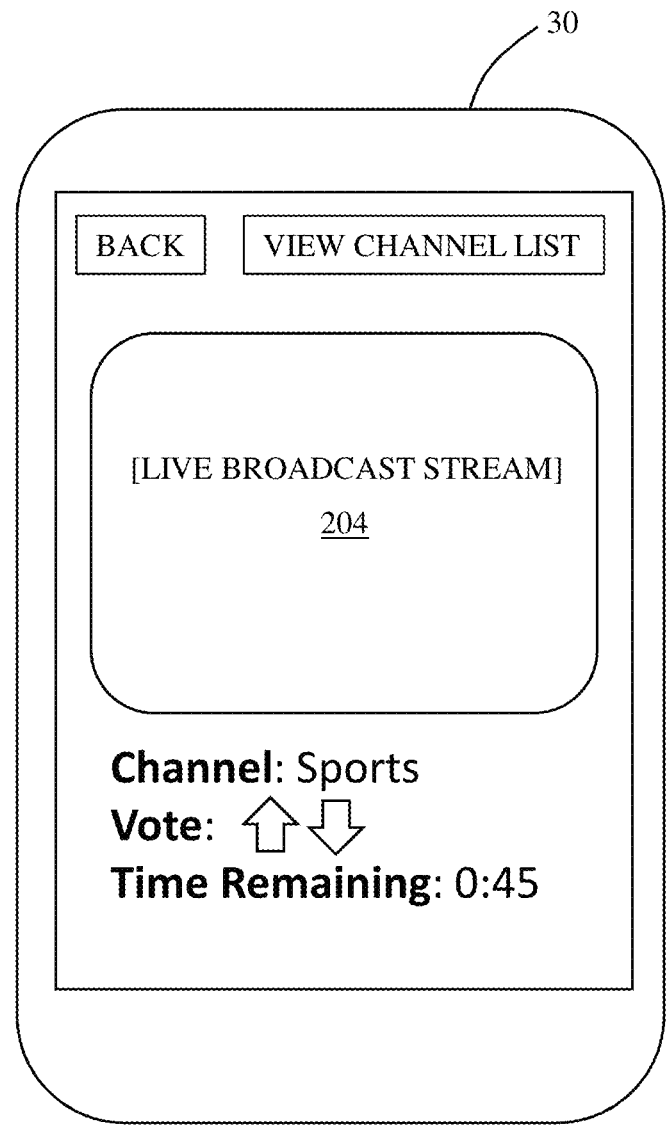
FIG. 4C is an exemplary screenshot of a voting device illustrating the live broadcast stream in accordance with at least one embodiment of the present invention.

In addition, with reference to FIG. 4B, in one embodiment, the content viewing users 32, 42, using their respective device(s) 30, 40, are able to view a list of channels 202, such as themed channels upon which live content may be broadcasted or streamed. Selecting a channel from the list 202 or other channel display will cause the corresponding device 30, 40 to receive and display a corresponding broadcast or media stream, including, for example, an audio and/or content stream 204, as shown, for example, in FIG. 4C. While viewing the content stream or broadcast 204, voting users 32 may be able to submit votes or rate the current broadcast.

Particularly, the system 10 and method 100 further includes receiving and tracking votes attributed to a broadcast or media stream, as represented in the flow chart of FIG. 3 at 104, via a voting module 66, which may include any combination of hardware and/or software configured to receive, track and attribute votes in accordance with at least one embodiment of the present invention. For example, referring back to FIG. 4C, users, and in particular voting users, may submit one or more votes attributed to the currently display or corresponding media broadcast, for example, by selecting an up arrow, down arrow, rating (e.g., on a numerical or graphical scale), etc. Upon submission of a vote, the broadcast management system 60 will receive the vote(s) and track the vote(s), via the voting module 66. The votes, in some embodiments, may be divided or tracked as 'positive' and/or 'negative' votes. For example, an up arrow (or its equivalent) may be characterized in some embodiments as a 'positive' vote, meaning, for example, the voting user 32 enjoyed or enjoys the broadcast. On the other hand, a down arrow (or its equivalent) may be characterized in some embodiments as a 'negative' vote, meaning, for example, the voting user 32 did not enjoy the broadcast.

Votes are received, collected and tallied during the corresponding broadcast, and in some instances may be displayed to the users, such as the content providing user 22, the voting user(s) 32, and/or the watching user(s) 42. In some embodiments, the time allotted for the particular broadcast or media stream may be extended in the event the broadcast is attributed a predetermined number of positive votes, for instance, during the broadcast. In such a case, additional broadcasting time may be added to the broadcast, allowing the broadcast to continue beyond the initial broadcast time.

As an example, a user broadcasting on a 'Sports' channel may be provided an initial broadcasting time of one minute or 60 seconds. During that time, for example, while the user 22 is broadcasting live on the Sports channel via his or her device, voting users 32, using a voting device 30, may view the live broadcast 204 and submit one or more votes. In an exemplary embodiment, the system 10 and/or method 100 may be configured such that every ten (10) positive votes will result in an additional broadcasting time in the amount of 10 seconds. Of course these numbers are provided for illustrative purposes only and should not be deemed limiting in any manner. In such a case, if the system 10 and/or method 100 receives (10) positive votes attributed to the corresponding broadcast, during the initial allotted time, then an additional ten seconds will be added to the broadcasting time. Otherwise, the broadcast will terminate or stop at the end of the timer.

Some embodiments (or some channels) may allow the time to be extended a predetermined number of times only (e.g., once, twice, etc.), although other embodiments (or other channels) may allow the time to be extended an indefinite number of times, so long as positive votes continue to be provided and attributed to the broadcast.

In any event, a broadcast may be terminated or stopped by the system 10 or method 100 upon the expiration of broadcasting time, e.g., either the initially allotted time, or the initially allotted time plus any additional time provided due to the collection of positive votes via the voting module 66. Particularly, referring back to the flow chart of FIG. 3, during the broadcast, the method 100 will determine whether additional time is warranted, as shown at 105. For example, as described above, additional time may be warranted upon the receipt of a predetermined number of positive votes during the broadcast. If additional time is added, some embodiments may continue to collect votes, for example, in order to determine is even more additional time is warranted. Once the broadcasting time has expired, as shown at 107, the broadcast is stopped or terminated 106.

Some embodiments of the system 10 and/or method 100 of the present invention may provide an additional mechanism upon which the broadcast may be terminated or stopped 106, for example, prior to the expiration of time. In particular, in at least one embodiment, the collection of or receipt of a predetermined number or percentage of 'negative' votes attributed to a broadcast can be used to immediately terminate or stop the broadcast. For example, with reference to 109 in FIG. 3, a 'kill switch' may be implemented such that when a broadcast is attributed a predetermined number or percentage of negative votes, the system 10 and/or method 100 may immediately terminate or stop the broadcast 106. For example, the system 10 or method 100 may include a predetermined number (e.g., 10, 50, 100) of negative votes that when received and attributed to a broadcast, will serve to immediately terminate the broadcast. Other embodiments may implement a 'kill switch' based upon a percentage of negative votes as compared to positive votes, or a percentage of negative votes as compared to the number of viewing users currently viewing the broadcast, as an example. For instance, one illustrative and non-limiting example, if approximately or exactly 80% of the votes received are negative votes, then the broadcast may be immediately or thereafter terminated. It should be noted that the number, amount or percentage of negative votes required to terminate a broadcast prior to the expiration of time (e.g., via the 'kill switch') may be different for different channels, users, regions, days, etc.

Further features of certain embodiments of the present invention include selecting or determining the next broadcasting user 22, for example, upon the expiration or termination of the current broadcast. For instance, in some embodiments, and in some instances, there is a continuous or near continuous stream of media or broadcast in a single channel such that when one broadcast ends (either via expiration of time or termination via the 'kill switch'), another broadcast will begin, generally from a different user, via different content providing device 20 and from a different physical or geographic location.

Selection or determination of the next broadcasting user 22 or device 20 may include a jump zone module 67 (as provided by reference character 108 in FIG. 3) and/or a next broadcaster selection module 68 (as provided by reference character 110 in FIG. 3). Particularly, the jump zone module 67 of at least one embodiment of the present invention comprises one or more hardware and/or software components that are structured to determine or define an area, region, or physical zone, e.g. a jump zone 50, from which to select the next broadcaster 22'. For example, the jump zone module 67 may utilize a set of jump zone criteria to determine or define the jump zone 50 from which the next broadcaster 22' will be selected. The jump zone criteria may be different for different channels or implementations of the various embodiments of the present invention.

Figure 5:
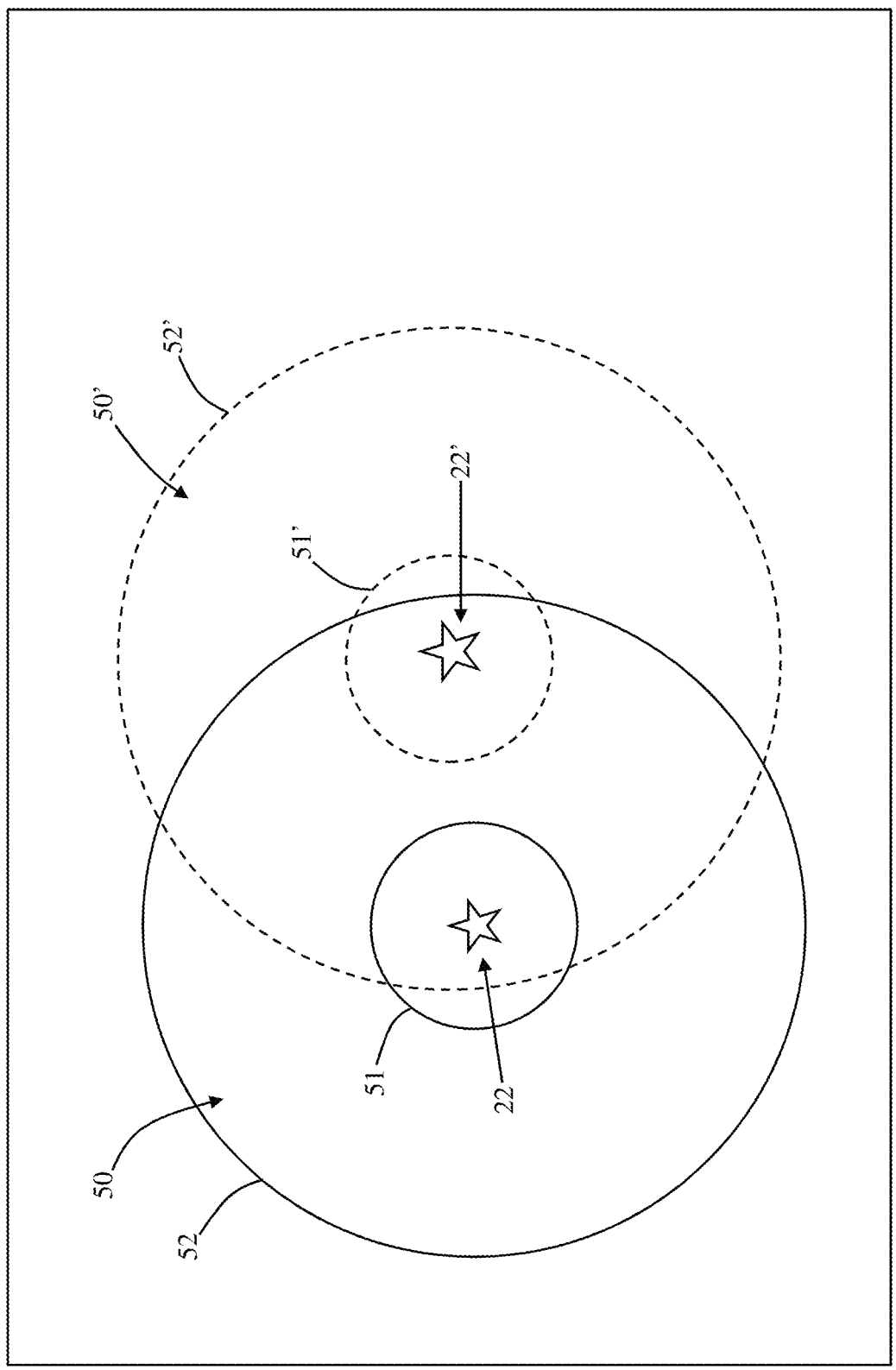
FIG. 5 is an exemplary schematic representation of the system illustrating overlapping jump zones as disclosed herein.

With reference to exemplary FIG. 5, in one embodiment, the jump zone 50 may be defined by jump zone criteria such as a minimum distance 51 and a maximum distance 52 from the location of the current broadcaster 22. Specifically, the geographic location of the broadcaster 22 may be determined in a number of different ways, for example, via accessing GPS or location based hardware/software of the content providing device 20. For example, use of the system 10 or method 100 of some embodiments may allow access to the GPS or location data obtained by the device 20 itself, which, as above, may be a cellular phone, tablet computer, laptop computer, desktop computer, etc. Other embodiments may obtain the location of the users 22 by information provided in a corresponding user profile or other means or manners.

In any event, with the location of the user 22, or current broadcaster known or estimated, in some embodiments the jump zone 50 may be calculated or determined based upon a minimum distance 51 and a maximum distance 52 from the user's 20 location. In this regard, the next broadcaster 22' must be located within a radial distance from the current user 20 defined by the jump zone criteria, such as a physical or geographic region defined between the minimum distance 51 and maximum distance 52. In one exemplary embodiment, the minimum distance 51 may be three (3) or five (5) miles and the maximum distance 52 may be fifty (50) miles, such that the next broadcaster 22' must be located within a radial distance between three or five and fifty miles from the current broadcasting user 22. Of course, other distances and criteria may be used and implemented within the full spirit and scope of the present invention, whether greater or lesser than three (3) or fifty (50) miles. In addition, for example, the jump zone 50 may be defined by only a minimum distance 51 or only a maximum distance 52.

Similarly, at the end of the next user's 22' broadcast, the system 10 and/or method 100 will determine or calculate the next jump zone 50', for example, based upon a minimum distance 51' and a maximum distance 52', or other jump zone criteria. As can be seen, this creates a dynamic or moving jump zone 50, 50' that moves physically or geographically as the content providing user 22, 22' changes in accordance with the various embodiments of the present invention.

In other embodiments, and/or in other channels, the jump zones 50 may be determined based upon other jump zone criteria, such as, for example, landmarks, states, countries, colleges, universities, geographic regions or areas, etc. In particular, rather than defining the jump zone 50 as a radial physical area surrounding the current broadcasting user 20, some embodiments may define the jump zone 50 in different areas of the country or World.

As an example, if the jump zone criteria is a state, then the next broadcasting user 22' may be selected from a different state from the location of the current broadcasting user 20. For instance, if the current broadcasting user 20 is located in Florida, then the next broadcasting user 22' may be selected from an adjacent state (e.g., Georgia), a next state in a predetermined list of states, or from any of the other states, excluding Florida. The same or similar process may be used to define a jump zone 50 with jump zone criteria being a different country, college, university, stadium, etc.

Once the jump zone 50 is defined (whether it is defined as a radial or other distance from the current broadcaster 20, as a different landmark, country, state, college, university, etc., or as a zone defined by other jump zone criteria), the method 100 further include selecting the next broadcaster 22' from within the jump zone 50, as shown at 110, for example, from a pool of or a plurality of potential broadcasting users. Specifically, with the jump zone 50 defined, there may be a plurality of users 22 that have indicated their desire to broadcast content next, for example, on a particular channel. Since some embodiments only allow a single broadcaster 22 at a time on each channel, the system 10 and/or method 100 of at least one embodiment may need to select the next broadcaster 22' based upon certain selection criteria.

For instance, in some embodiments, the selection criteria may be defined as temporal priority criteria, meaning that the first user within the jump zone to indicate his or her desire to broadcast (and, in some embodiments who is available to broadcast immediately at the conclusion of the current or prior broadcast) will be given the opportunity to broadcast from his or her device 20. It should also be noted that some embodiments or some channels may not have a jump zone defined, and may instead use the temporal priority criteria of the next broadcaster selection module 68 to select the next broadcaster. In such a case, the next broadcaster may be located virtually anywhere, since a jump zone may not be defined as a limiting characteristic in selecting the next broadcaster.

In other embodiments, the next broadcaster selection module 68 may use a ranking or point system criteria in order to define the next broadcasting user 22', for example, within the jump zone 50, when a jump zone 50 is defined. In particular, in order for a broadcasting user 22 to obtain points or otherwise increase his or her rank, in at least one embodiment, the broadcasting user 22 can share content and/or complete tasks within the system 10 and method 100 of the present invention. For example, tasks may include completing or conducting consumer (or other) surveys, purchasing items (goods or services) via the system 10 or method 100, sharing content via other social networks, broadcasting media as described herein, submitting votes for other broadcasts within the system 10 and method 100, etc. Completion of certain tasks may result in the allotment of points or accumulating credits, for example. The more points or credits a user has, the higher his or her rank within the system 10 and/or method 100 of the present invention. Other tasks, opportunities, etc. can be used within the full spirit and scope of the present invention in order to accumulate or obtain points, credits, etc. and thereby increase a user ranking.

Accordingly, in at least one embodiment, the next broadcaster selection module 68 may identify the user or potential broadcaster within the jump zone 50 (if a jump zone is defined) that has the highest rank, or otherwise has the highest number of points, credits, etc. associated with his or her account or user profile. That user will then be the next broadcasting user 22' and upon termination or expiration of the current or prior broadcast, the next broadcasting user 22' will be given the opportunity to broadcast media from his or her device 20, as shown at 112.

In this regard, the broadcasting users 22, 22' must complete tasks and other opportunities to obtain points or credits and hope to outrank other broadcasting users 22, 22' located within the jump zone 50 for the opportunity to broadcast media via the system 10 and method 100 of at least one embodiment of the present invention. As provided above, if the broadcasting user 22, 22' wins the opportunity to broadcast media, then he or she is assigned a specific (often predetermined) amount of time to broadcast live on a particular themed (or other) channel. During the allotted amount of time, voting users 32 can submit votes attributed to the broadcast or broadcaster—positive votes may result in additional time allotted to the current broadcast or broadcaster, whereas negative votes may result in premature termination of the current broadcast or broadcaster.

Additional features of some embodiments may include the incorporation of a digital music service module 69 or digital media module which may include hardware/software components that allow content viewing users, such as voting users 32 and/or watching users 42, to connect or sync a third-party or external digital music service to the system 10 and/or method 100 of the present invention.

Particularly, many users, such as content viewing users, may subscribe independently to or otherwise have an account with a third-party digital music service, such as Spotify, Pandora, Apple Music, etc. The content viewing user(s) may register or connect his or her third-party digital music service account with his or her profile or account with the present system 10 and method 100, for example, by providing username, password or other account-identifying information with regard to the third-party digital music service.

When an independent or other third-party digital music service is synced, registered, otherwise connected to the system 10 and/or method 100 of the present invention, for example, via the digital music service module 69, either the digital music service itself or the digital music service module 69 of the present invention may function to detect a song (e.g., a copyrighted song) that may be playing in a broadcast, e.g., by a broadcasting user 20. Upon detection, the digital music service or the digital music service module of the present invention may simultaneously play the detected song, music, or other audio content from the viewing user's account or profiled of the third-party digital music service (e.g., Spotify, Pandora, etc.) rather than, instead of, or in sync with the music that may be playing via the actual broadcast or live media stream. This may allow the content viewing user, e.g., the voting user 32 and/or watching user 42, the ability to adjust the music volume. In addition, this may allow a broadcasting user 22, the ability to select a song to play while broadcasting, for example, a song from a list of affiliated digital music services. At least one purpose of this aspect may be to allow an artist to be paid or compensated by the digital media service for their creative work.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. This written description provides an illustrative explanation and/or account of the present invention. It may be possible to deliver equivalent benefits using variations of the specific embodiments, without departing from the inventive concept. This description and these drawings, therefore, are to be regarded as illustrative and not restrictive.

Now that the invention has been described,
What is claimed is:

1. A dynamic live media streaming method comprising:
broadcasting, via a broadcast management system, a live media stream from at least one broadcasting device over at least one network to a plurality of content viewing devices, the broadcast management system comprising a computer processor, memory, storage device and at least one network communication device for communication between the at least one broadcasting device and the plurality of content viewing devices,
determining a jump zone based upon at least one predetermined jump zone criteria, the jump zone comprising a physical area where a next broadcasting device must be located,
selecting the next broadcasting device that is physically located in the jump zone,
stopping the live media stream from the at least one broadcasting device based on a collection of votes attributed to the live media stream, and
broadcasting another live media stream from the next broadcasting device.

2. The method as recited in claim 1 wherein stopping the live media stream from the at least one broadcasting device is based upon an expiration of broadcasting time.

3. The method as recited in claim 1 further comprising defining the predetermined jump zone criteria as comprising a minimum distance from the at least one broadcasting device, and a maximum distance from the at least one broadcasting device; wherein the physical geographic region of the jump zone is defined as being within the minimum distance from the at least one broadcasting device and the maximum distance from the at least one broadcasting device.

4. A live media streaming method comprising:
broadcasting, via a broadcast management system, a live media stream in at least one of a plurality of broadcasting channels, the live media stream being transmitted from a broadcasting device corresponding to a broadcasting user, the broadcast management system comprising a computer processor, memory, storage device and at least one network communication device for communication between the at least one broadcasting device and a plurality of content viewing devices,
determining a jump zone based upon predetermined jump zone criteria corresponding to the at least one of the plurality of broadcasting channels, the jump zone comprising a physical region,
wherein the jump zone of at least one of the plurality of broadcasting channels is determined based upon a location of the broadcasting user,
defining the predetermined jump zone criteria corresponding to the at least one of the plurality of broadcasting channels as comprising a minimum distance from the broadcasting user and a maximum distance from the broadcasting user; wherein the physical region is defined as being within the minimum distance and the maximum distance,
selecting a next broadcasting user corresponding to a location within the physical region of the jump zone,
prior to broadcasting the live media stream from the next broadcasting device, stopping the live media stream from the broadcasting device, and
broadcasting another live media stream in the at least one of a plurality of broadcasting channels from a next broadcasting device corresponding to the next broadcasting user.

5. The method as recited in claim 4 wherein stopping the live media stream is based upon an expiration of broadcasting time.

6. The method as recited in claim 4 wherein stopping the live media stream is based upon a receipt of votes attributed to the live media stream transmitted from the broadcasting device.

7. The method as recited in claim 4 wherein selecting the next broadcasting user comprises selecting a broadcasting user comprising a higher rank than other potential users located within the jump zone.

8. A dynamic live media streaming method comprising:
broadcasting, via a broadcast management system, a live media stream from at least one broadcasting device over at least one network to a plurality of content viewing devices, the broadcast management system comprising a computer processor, memory, storage device and at least one network communication device for communication between the at least one broadcasting device and the plurality of content viewing devices,
determining a jump zone based upon at least one predetermined jump zone criteria, the jump zone comprising a physical geographic region where a next broadcasting device must be located,
stopping the live media stream from the at least one broadcasting device based upon a receipt of votes attributed to the live media stream from the at least one broadcasting device,
selecting the next broadcasting device in the jump zone, and
broadcasting a live media stream from the next broadcasting device.

9. A dynamic live media streaming method comprising:
broadcasting, via a broadcast management system, a live media stream from at least one broadcasting device over at least one network to a plurality of content viewing devices, the broadcast management system comprising a computer processor, memory, storage device and at least one network communication device for communication between the at least one broadcasting device and the plurality of content viewing devices,
determining a jump zone based upon at least one predetermined jump zone criteria, the jump zone comprising a physical area where a next broadcasting device must be located,
defining the predetermined jump zone criteria as comprising a minimum distance from the at least one broadcasting device, and a maximum distance from the at least one broadcasting device, wherein the physical area of the jump zone is defined as being within the minimum distance from the at least one broadcasting device and the maximum distance from the at least one broadcasting device, selecting a next broadcasting device that is physically located in the jump zone, stopping the live media stream from the at least one broadcasting device, and broadcasting another live media stream from the next broadcasting device.

\* \* \* \* \*